United States Patent
Venugopal et al.

(10) Patent No.: US 12,156,289 B2
(45) Date of Patent: Nov. 26, 2024

(54) SIGNALING USER EQUIPMENT MULTI-PANEL CAPABILITY

(71) Applicant: QUALCOMM Incorporated, San Diego, CA (US)

(72) Inventors: Kiran Venugopal, Green Brook, NJ (US); Yan Zhou, San Diego, CA (US); Jung Ho Ryu, Fort Lee, NJ (US); Tianyang Bai, Somerville, NJ (US); Junyi Li, Fairless Hills, PA (US); Tao Luo, San Diego, CA (US)

(*) Notice: Subject to any disclaimer, the term of this patent is extended or adjusted under 35 U.S.C. 154(b) by 0 days.

(21) Appl. No.: 17/822,519

(22) Filed: Aug. 26, 2022

(65) Prior Publication Data

US 2022/0417732 A1   Dec. 29, 2022

Related U.S. Application Data

(63) Continuation of application No. 16/869,313, filed on May 7, 2020, now Pat. No. 11,457,350.

(60) Provisional application No. 62/846,469, filed on May 10, 2019.

(51) Int. Cl.
| | | |
|---|---|---|
| *H04W 4/00* | (2018.01) | |
| *H04W 8/24* | (2009.01) | |
| *H04W 72/21* | (2023.01) | |
| *H04W 72/23* | (2023.01) | |
| *H04W 76/27* | (2018.01) | |
| *H04W 80/02* | (2009.01) | |

(52) U.S. Cl.
CPC ............ *H04W 8/24* (2013.01); *H04W 72/21* (2023.01); *H04W 72/23* (2023.01); *H04W 76/27* (2018.02); *H04W 80/02* (2013.01)

(58) Field of Classification Search
CPC ............ H04W 16/28; H04W 72/0413; H04W 72/042; H04B 7/0691; H04B 7/0695
See application file for complete search history.

(56) References Cited

U.S. PATENT DOCUMENTS

| | | |
|---|---|---|
| 2017/0332370 A1 | 11/2017 | Rico Alvarino et al. |
| 2018/0262313 A1 | 9/2018 | Nam et al. |
| 2019/0141643 A1 | 5/2019 | Molavianjazi et al. |
| 2020/0029274 A1 | 1/2020 | Cheng et al. |
| 2020/0083939 A1 | 3/2020 | Park et al. |
| 2020/0107327 A1* | 4/2020 | Wang .................. H04W 72/044 |

(Continued)

FOREIGN PATENT DOCUMENTS

| | | |
|---|---|---|
| CN | 109391296 A | 2/2019 |
| EP | 3562052 A1 | 10/2019 |

(Continued)

OTHER PUBLICATIONS

International Preliminary Report on Patentability—PCT/US2020/032170, The International Bureau of WIPO—Geneva, Switzerland, Nov. 25, 2021.

(Continued)

*Primary Examiner* — Bo Hui A Zhu

(57) ABSTRACT

Various aspects of the present disclosure generally relate to wireless communication. In some aspects, a user equipment (UE) may identify one or more multi-panel capabilities for multi-panel operation of a plurality of panels associated with the UE. The UE may transmit, to a base station (BS), an indication of the one or more multi-panel capabilities. Numerous other aspects are provided.

30 Claims, 5 Drawing Sheets

(56) References Cited

U.S. PATENT DOCUMENTS

| | | | |
|---|---|---|---|
| 2020/0196383 A1 | 6/2020 | Tsai et al. | |
| 2020/0288479 A1 | 9/2020 | Xi et al. | |
| 2020/0350972 A1* | 11/2020 | Yi | H04L 1/12 |
| 2020/0359197 A1 | 11/2020 | Venugopal et al. | |
| 2021/0274438 A1 | 9/2021 | Guan | |
| 2022/0225320 A1* | 7/2022 | Li | H04W 16/28 |

FOREIGN PATENT DOCUMENTS

| | | |
|---|---|---|
| WO | 2018182381 A1 | 10/2018 |
| WO | 2019195528 A1 | 10/2019 |

OTHER PUBLICATIONS

International Search Report and Written Opinion—PCT/US2020/032170—ISA/EPO—Jul. 29, 2020.

* cited by examiner

SIGNALING USER EQUIPMENT MULTI-PANEL CAPABILITY

CROSS-REFERENCE TO RELATED APPLICATIONS

This application is a continuation of U.S. patent application Ser. No. 16/869,313, filed May 7, 2020, entitled "SIGNALING USER EQUIPMENT MULTI-PANEL CAPABILITY," which claims priority to U.S. Provisional Patent Application No. 62/846,469, filed on May 10, 2019, entitled "SIGNALING USER EQUIPMENT MULTI-PANEL CAPABILITY," which are incorporated herein by reference in their entireties.

FIELD OF THE DISCLOSURE

Aspects of the present disclosure generally relate to wireless communication and to techniques and apparatuses for signaling user equipment (UE) multi-panel capability.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include identifying one or more multi-panel capabilities for multi-panel operation of a plurality of panels associated with the UE; and transmitting, to a base station (BS), an indication of the one or more multi-panel capabilities.

In some aspects, a UE for wireless communication may include memory and one or more processors operatively coupled to the memory. The memory and the one or more processors may be configured to identify one or more multi-panel capabilities for multi-panel operation of a plurality of panels associated with the UE; and transmit, to a BS, an indication of the one or more multi-panel capabilities.

In some aspects, a non-transitory computer-readable medium may store one or more instructions for wireless communication. The one or more instructions, when executed by one or more processors of a UE, may cause the one or more processors to identify one or more multi-panel capabilities for multi-panel operation of a plurality of panels associated with the UE; and transmit, to a BS, an indication of the one or more multi-panel capabilities.

In some aspects, an apparatus for wireless communication may include means for identifying one or more multi-panel capabilities for multi-panel operation of a plurality of panels associated with the apparatus; and means for transmitting, to a BS, an indication of the one or more multi-panel capabilities.

In some aspects, a method of wireless communication, performed by a BS, may include receiving, from a UE, an indication of one or more multi-panel capabilities for multi-panel operation of a plurality of panels associated with the UE; and transmitting, to the UE and based at least in part on the one or more multi-panel capabilities, a scheduling configuration for multi-panel operation of the plurality of panels.

In some aspects, a BS for wireless communication may include memory and one or more processors operatively coupled to the memory. The memory and the one or more processors may be configured to receive, from a UE, an indication of one or more multi-panel capabilities for multi-panel operation of a plurality of panels associated with the UE; and transmit, to the UE and based at least in part on the one or more multi-panel capabilities, a scheduling configuration for multi-panel operation of the plurality of panels.

In some aspects, a non-transitory computer-readable medium may store one or more instructions for wireless communication. The one or more instructions, when executed by one or more processors of a BS, may cause the one or more processors to receive, from a UE, an indication of one or more multi-panel capabilities for multi-panel operation of a plurality of panels associated with the UE; and transmit, to the UE and based at least in part on the one or more multi-panel capabilities, a scheduling configuration for multi-panel operation of the plurality of panels.

In some aspects, an apparatus for wireless communication may include means for receiving, from a UE, an indication of one or more multi-panel capabilities for multi-panel operation of a plurality of panels associated with the UE; and means for transmitting, to the UE and based at least in part on the one or more multi-panel capabilities, a scheduling configuration for multi-panel operation of the plurality of panels.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
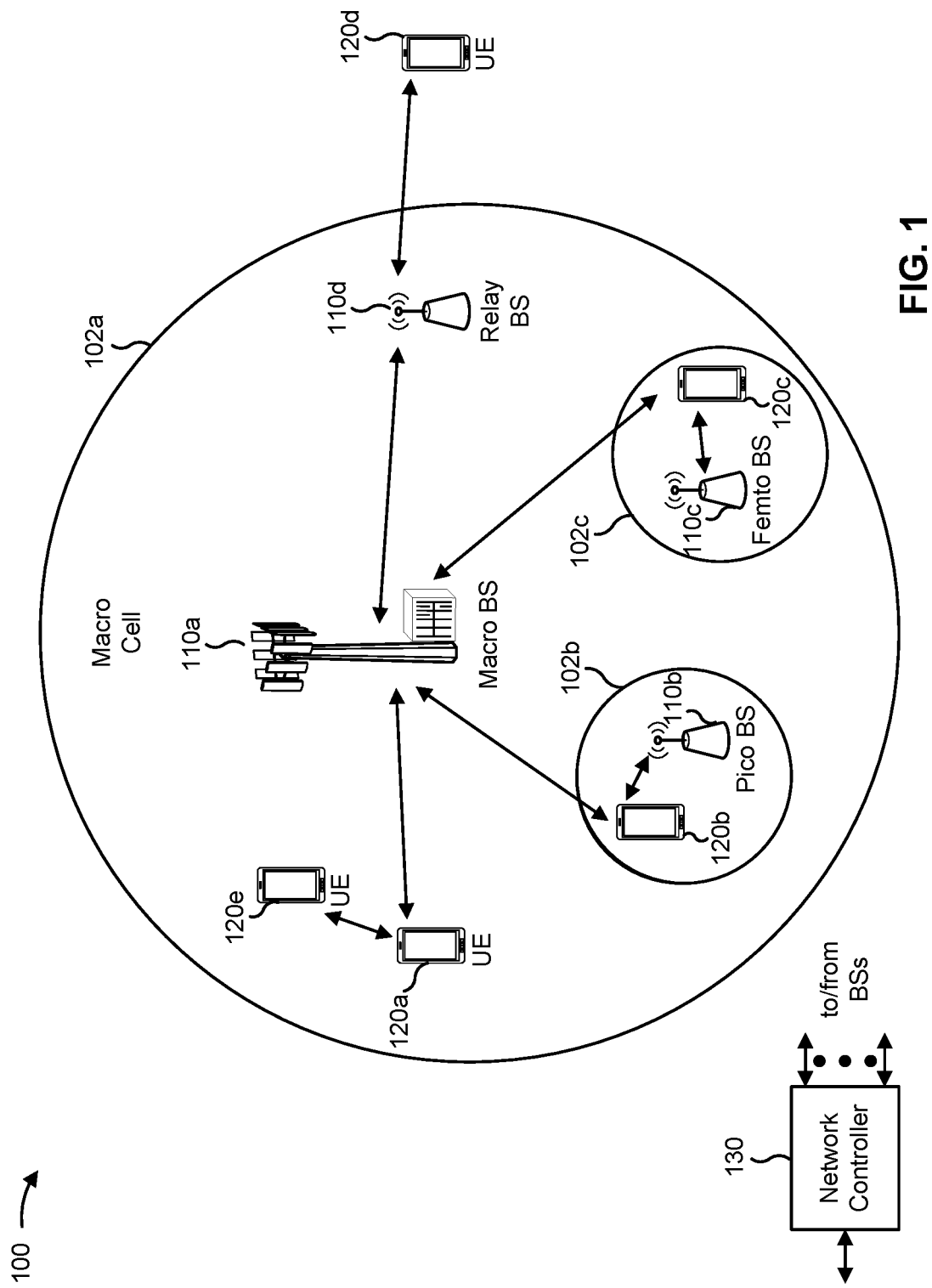
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
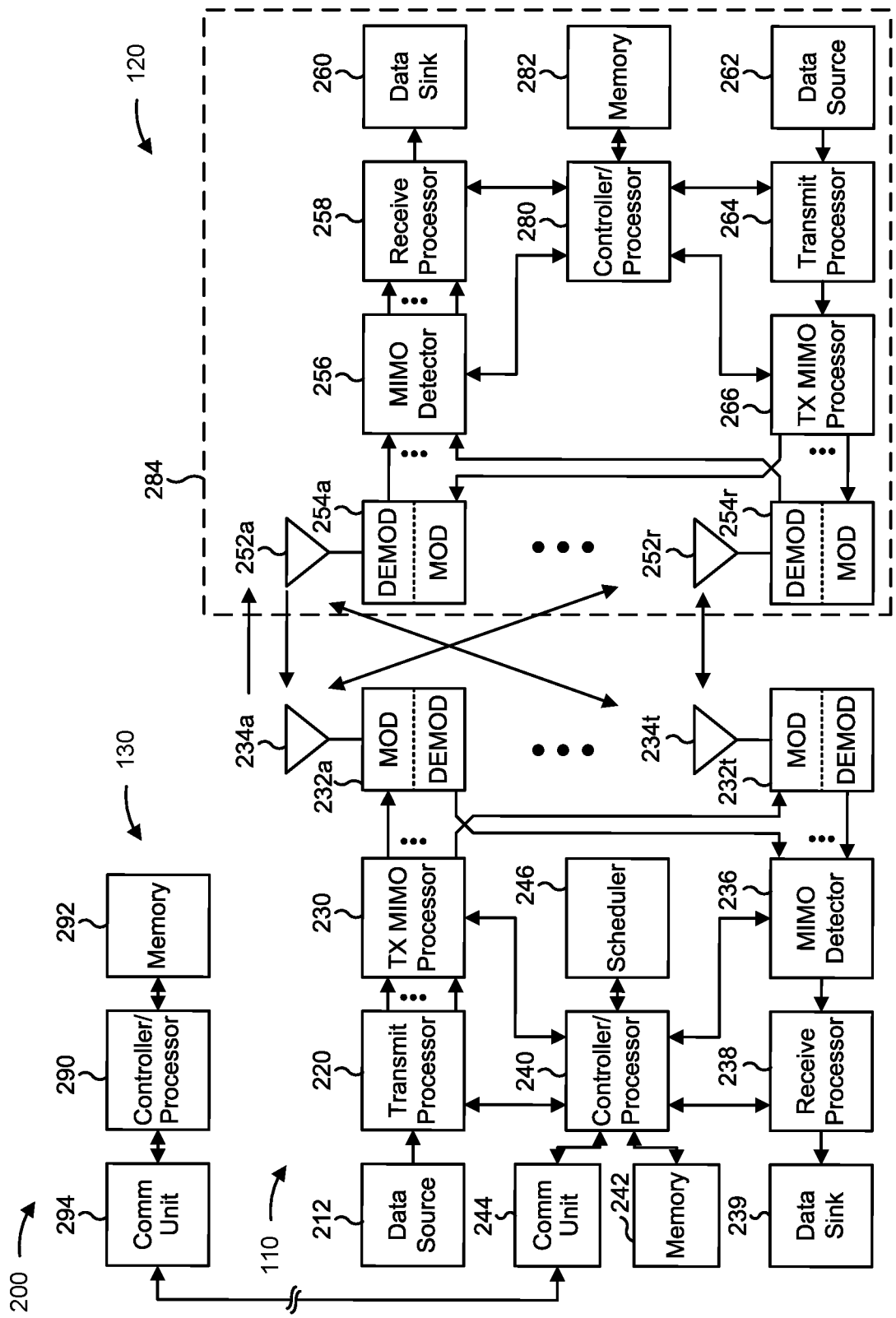
FIG. 2 is a block diagram conceptually illustrating an example of a base station (BS) in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling user equipment (UE) multi-panel capability, as described in more detail elsewhere herein. For example, controller/processor 240 of base station 110, controller/processor 280 of UE 120, and/or any other component(s) of FIG. 2 may perform or direct operations of, for example, process 400 of FIG. 4, process 500 of FIG. 5, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for identifying one or more multi-panel capabilities for multi-panel operation of a plurality of panels associated with the UE 120, means for transmitting, to a base station 110, an indication of the one or more multi-panel capabilities, and/or the like. In some aspects, such means may include one or more components of UE 120 described in connection with FIG. 2.

In some aspects, base station 110 may include means for receiving, from a UE 120, an indication of one or more multi-panel capabilities for multi-panel operation of a plurality of panels associated with the UE 120, means for transmitting, to the UE 120 and based at least in part on the one or more multi-panel capabilities, a scheduling configuration for multi-panel operation of the plurality of panels, and/or the like. In some aspects, such means may include one or more components of base station 110 described in connection with FIG. 2.

As indicated above, FIG. 2 is provided as an example. Other examples may differ from what is described with regard to FIG. 2.

In some cases, a UE may be a multi-panel device that is capable of communicating with a BS using millimeter wave (mmWave) transmission (e.g., using frequencies above 24 GHz). In this case, the UE may be equipped with a plurality of panels that are comprised of a plurality of antenna components (e.g., 16 antenna components, 32 antenna components, and/or the like). A panel, for purposes of multi-panel operation, may include antenna components that are capable of independent control of a transmission beam relative to other panels, that are capable of independently controlling transmission power relative to other panels, that have a common uplink transmission timing, and/or the like. While the UE may be capable of using the plurality of panels for transmit diversity, uplink coverage enhancement, MIMO, increasing throughput, and/or the like, a BS that communicates with the UE may be unaware of the multi-panel capabilities of the UE. As a result, the BS may be unable to schedule communications with the UE in a manner that fully utilizes the multi-panel capabilities of the UE.

Some aspects, described herein, provide techniques and apparatuses for signaling UE multi-panel capability. In some aspects, a multi-panel UE may transmit, to a BS, an indication of one or more multi-panel capabilities for multi-panel operation. The BS may receive the indication of one or more multi-panel capabilities and may transmit, to the UE a scheduling configuration that is generated based at least in part on the indication of one or more multi-panel capabilities. In this way, the scheduling configuration may utilize the multi-panel capabilities of the UE such that the UE may use multi-panel operations for transmit diversity, uplink coverage enhancement, MIMO, increasing throughput, and/or the like.

Figure 3:
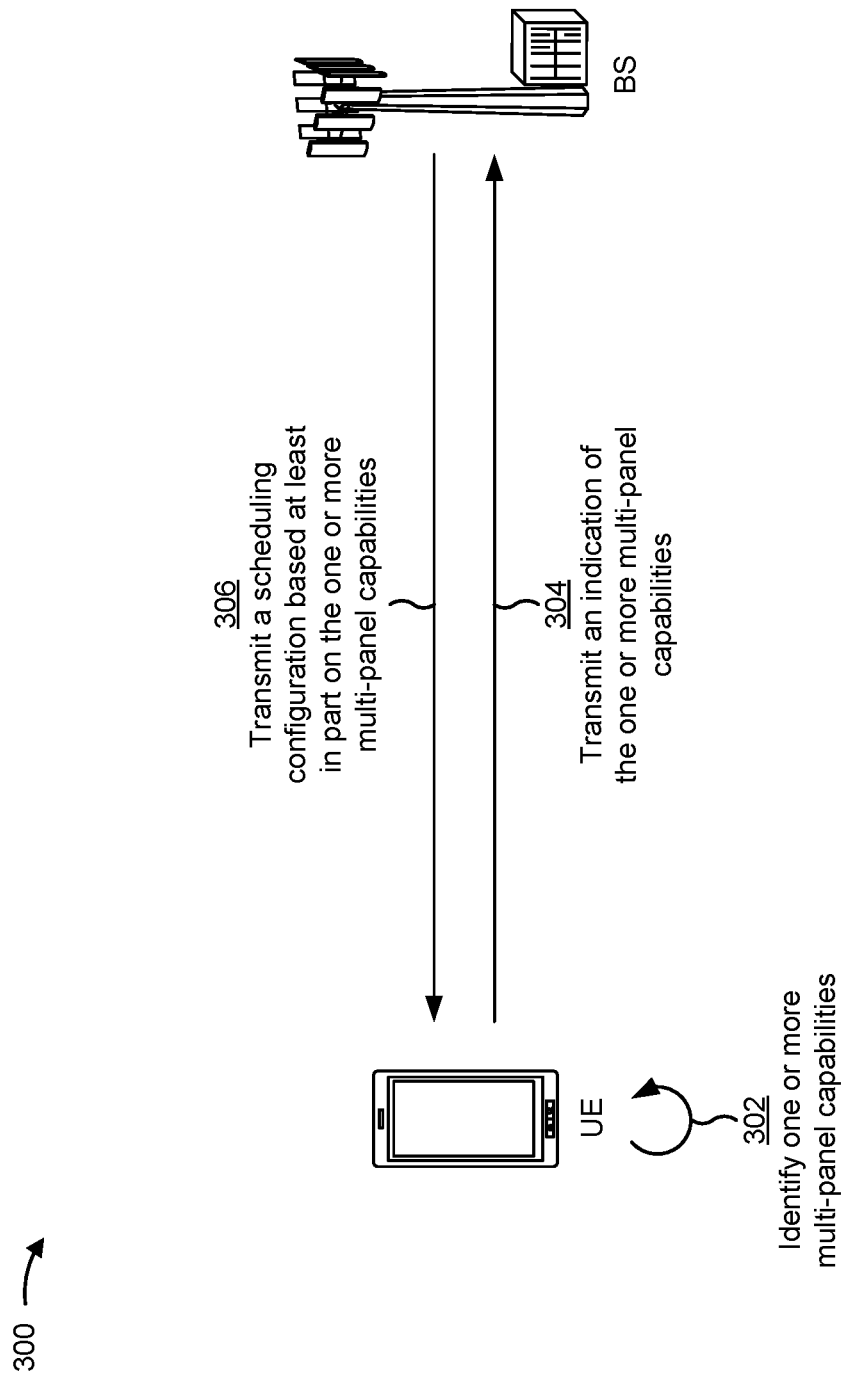
FIG. 3 is a diagram illustrating an example of signaling UE multi-panel capability, in accordance with various aspects of the present disclosure.

FIG. 3 is a diagram illustrating an example 300 of signaling UE multi-panel capability, in accordance with various aspects of the present disclosure. As shown in FIG. 3, example 300 may include communication between a UE (e.g., UE 120) and a BS (e.g., BS 110). The UE may be a multi-panel device that includes a plurality of panels (e.g., antenna panels). The UE may communicate with the BS and/or other communication devices in multi-panel operation using the plurality of panels.

As shown in FIG. 3, and by reference number 302, to permit multi-panel operation at the UE, the UE may identify one or more multi-panel capabilities for multi-panel operation of the plurality of panels included in the UE.

The one or more multi-panel capabilities may include a total quantity of the plurality of panels included in the UE. Moreover, the UE may indicate respective identifiers associated with the plurality of panels. The respective identifiers may include panel identifiers that are based at least in part on a sounding reference signal (SRS) resource set identifier, an identifier that is associated with a reference signal resource or resource set, an identifier that is assigned to a target reference signal resource or resource set, an identifier that is configured based at least in part on a spatial relationship, and/or the like. In some aspects, the UE may indicate one or more respective measurements associated with the plurality of panels, which may include a signal-to-interference-plus-noise ratio (SINR), a transmit power measurement, and/or the like.

The one or more multi-panel capabilities may include a quantity of active panels supported by the UE. The quantity of active panels may be based at least in part on an operating state of the UE (e.g., whether the UE is in an active or connected state, idle state, inactive state, and/or the like), may be based at least in part on a battery level of the UE (e.g., the UE may activate a greater quantity of panels the greater the battery level of the UE), and/or the like.

The one or more multi-panel capabilities may include a time duration for switching between active panels that are scheduled for consecutive transmissions. For example, in some cases, a UE may not be capable of simultaneously transmitting using a plurality of active panels in multi-panel operation and instead may cycle through active panels for purposes of transmit diversity or increasing uplink coverage. Accordingly, the time duration for switching between active panels may indicate an amount of time the UE takes to terminate a first transmission on a first active panel and initiate a second transmission on a second active panel.

The one or more multi-panel capabilities may include respective quantities of spatial layers that are supported for each of the plurality of panels (e.g., a quantity of spatial layers on which a panel is capable of simultaneously transmitting). The one or more multi-panel capabilities may include respective quantities of beams that are supported for each the plurality of panels (e.g., a quantity of beams that a panel is capable of simultaneously transmitting). The one or more multi-panel capabilities may include respective activation times for each the plurality of panels. An activation time may indicate an amount of time that a particular panel takes to activate an associated radio frequency (RF) chain and/or another transmission component such that the panel is capable of performing a transmission.

The one or more multi-panel capabilities may include an indication of panels, of the plurality of panels, that may be grouped together to share a same power control parameter (e.g., a transmission power parameter, a pathloss parameter, and/or the like), a same timing alignment, a same activation status (e.g., the panels in the group may be activated and/or deactivated together), and/or the like. In some aspects, the one or more multi-panel capabilities may include one or more of the multi-panel capabilities and/or other multi-panel capabilities described above.

As further shown in FIG. 3, and by reference number 304, the UE may transmit, to the BS, an indication of the one or more multi-panel capabilities. The UE may transmit the indication of the one or more multi-panel capabilities in one or more communications that may include one or more radio resource control (RRC) communications, one or more uplink control information (UCI) communications, and/or the like. In some aspects, the UE may transmit the one or more communications based at least in part on receiving a request (e.g., from the BS) for the indication of the one or more multi-panel capabilities, may transmit the one or more communications based at least in part on communicatively connecting with the BS (e.g., as part of the connection establishment process), may transmit the one or more communications on a periodic basis, and/or the like.

In some aspects, after the UE transmits the indication of the one or more multi-panel capabilities to the BS, the UE may transmit, to the BS, indications of updates to the multi-panel capabilities of the UE such that the BS may adjust the scheduling configuration for the UE. For example, the UE may transition to an idle state, and the UE may transmit (e.g., prior to the transition) an indication of an updated quantity of active panels supported by the UE due to the UE transitioning to the idle state.

As further shown in FIG. 3, and by reference number 306, the BS may receive the indication of the one or more multi-panel capabilities and may generate and transmit a scheduling configuration to the UE. In some aspects, the BS may transmit an indication of the scheduling configuration in one or more communications, such as one or more RRC communications, one or more medium access control (MAC) control element (MAC-CE) communications, one or more downlink control information (DCI) communications, and/or the like.

The scheduling configuration may be generated based at least in part on the one or more multi-panel capabilities of the UE. For example, the BS may identify, based at least in part on the indication of the quantity of panels, one or more requested panels that are to be used for communication with the BS. In this case, the BS may identify the one or more requested panels based at least in part on the one or more measurements associated with the one or more requested panels. The UE may receive the scheduling configuration and may activate the one or more requested panels. The scheduling configuration may include an indication of the one or more requested panels. For example, the scheduling configuration may include the respective panel identifiers associated with the one or more requested panels.

In some aspects, the BS may specify, in the scheduling configuration, a quantity of symbols and/or slots between respective transmissions associated with active panels of the UE. For example, the BS may determine the quantity of symbols and/or slots, based at least in part on the indication of the time duration for switching between the active panels, such that the quantity of symbols and/or slots aligns with the time duration for switching between the active panels.

In this way, the UE may transmit, to a BS, an indication of one or more multi-panel capabilities for multi-panel operation of the UE. The BS may receive the indication of one or more multi-panel capabilities and may transmit, to the UE, a scheduling configuration that is generated based at least in part on the indication of one or more multi-panel capabilities. In this way, the scheduling configuration may utilize the multi-panel capabilities of the UE such that the UE may use multi-panel operations for transmit diversity, uplink coverage enhancement, MIMIO, increasing throughput, and/or the like.

As indicated above, FIG. 3 is provided as one or more examples. Other examples may differ from what is described with respect to FIG. 3.

Figure 4:
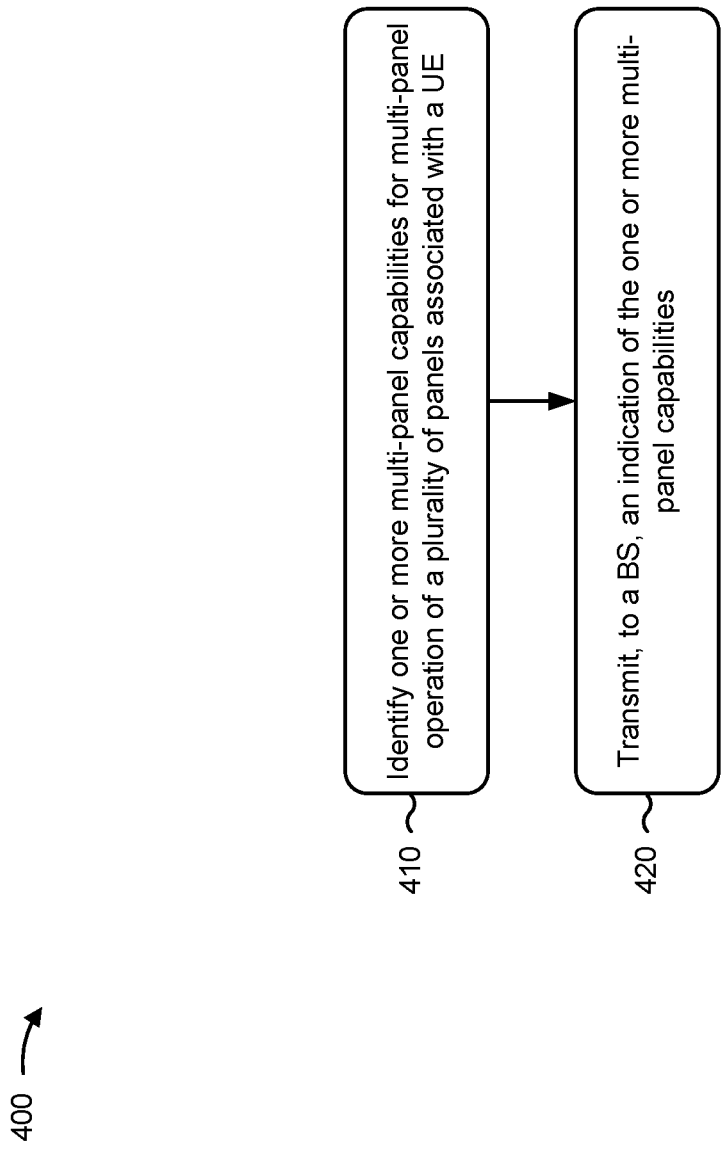
FIG. 4 is a diagram illustrating an example process performed, for example, by a UE, in accordance with various aspects of the present disclosure.

FIG. 4 is a diagram illustrating an example process 400 performed, for example, by a UE, in accordance with various aspects of the present disclosure. Example process 400 is an example where a UE (e.g., UE 120) performs operations associated with signaling UE multi-panel capability.

As shown in FIG. 4, in some aspects, process 400 may include identifying one or more multi-panel capabilities for multi-panel operation of a plurality of panels associated with the UE (block 410). For example, the UE (e.g., using receive processor 258, transmit processor 264, controller/processor 280, memory 282, and/or the like) may identify one or more multi-panel capabilities for multi-panel operation of a plurality of panels associated with the UE, as described above.

As further shown in FIG. 4, in some aspects, process 400 may include transmitting, to a BS, an indication of the one or more multi-panel capabilities (block 420). For example, the UE (e.g., using receive processor 258, transmit processor 264, controller/processor 280, memory 282, and/or the like) may transmit, to a BS, an indication of the one or more multi-panel capabilities, as described above.

Process 400 may include additional aspects, such as any single aspect or any combination of aspects described below and/or in connection with one or more other processes described elsewhere herein.

In a first aspect, transmitting the indication of the one or more multi-panel capabilities comprises transmitting a communication that includes the indication of the one or more multi-panel capabilities. In a second aspect, alone or in combination with the first aspect, the one or more multi-panel capabilities comprise at least one of a quantity of the plurality of panels, respective identifiers associated with the plurality of panels, a quantity of active panels supported by the UE, a time duration for switching between active panels that are scheduled for consecutive transmissions, respective quantities of spatial layers that are supported for the plurality of panels, respective quantities of beams that are supported for the plurality of panels, or respective activation times for the plurality of panels.

In a third aspect, alone or in combination with one or more of the first and second aspects, the one or more multi-panel capabilities comprise an indication of a group of panels, of the plurality of panels, that share one or more parameters. In a fourth aspect, alone or in combination with one or more of the first through third aspects, the one or more parameters comprise at least one of a same power control parameter, a same timing alignment, or a same activation status. In a fifth aspect, alone or in combination with one or more of the first through fourth aspects, the one or more multi-panel capabilities comprises a quantity of the plurality of panels, and process 400 further comprises receiving, from the BS, an indication of one or more requested panels, of the plurality of panels, that are to be used for communication with the BS. In a sixth aspect, alone or in combination with one or more of the first through fifth aspects, the one or more multi-panel capabilities comprises a time duration for switching between active panels, of the plurality of panels, that are scheduled for back-to-back transmission, and process 400 further comprises receiving, from the BS, an indication of a quantity of symbols between respective transmissions associated with the active panels.

Although FIG. 4 shows example blocks of process 400, in some aspects, process 400 may include additional blocks, fewer blocks, different blocks, or differently arranged blocks than those depicted in FIG. 4. Additionally, or alternatively, two or more of the blocks of process 400 may be performed in parallel.

Figure 5:
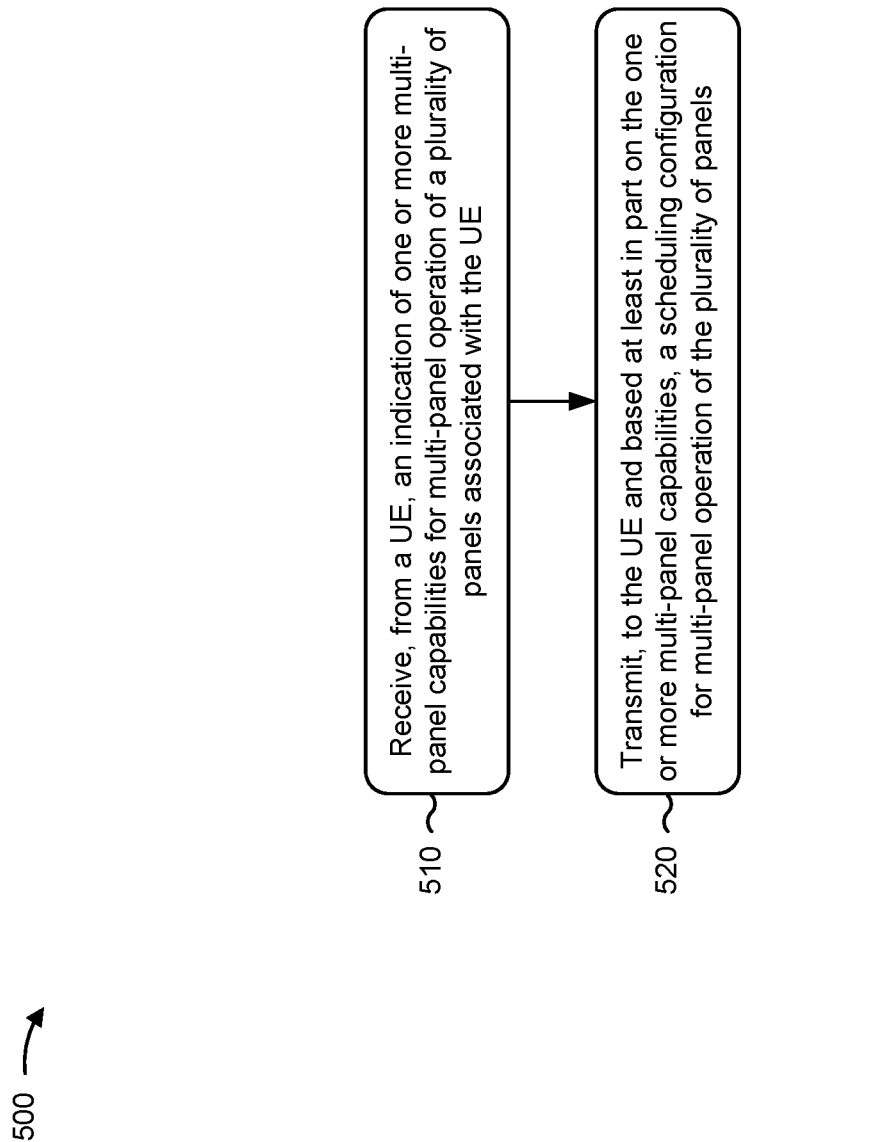
FIG. 5 is a diagram illustrating an example process performed, for example, by a BS, in accordance with various aspects of the present disclosure.

FIG. 5 is a diagram illustrating an example process 500 performed, for example, by a BS, in accordance with various aspects of the present disclosure. Example process 500 is an example where a BS (e.g., BS 110) performs operations associated with signaling UE multi-panel capability.

As shown in FIG. 5, in some aspects, process 500 may include receiving, from a UE, an indication of one or more multi-panel capabilities for multi-panel operation of a plurality of panels associated with the UE (block 510). For example, the BS (e.g., using transmit processor 220, receive processor 238, controller/processor 240, memory 242, and/or the like) may receive, from a UE, an indication of one or more multi-panel capabilities for multi-panel operation of a plurality of panels associated with the UE, as described above.

As further shown in FIG. 5, in some aspects, process 500 may include transmitting, to the UE and based at least in part on the one or more multi-panel capabilities, a scheduling configuration for multi-panel operation of the plurality of panels (block 520). For example, the BS (e.g., using transmit processor 220, receive processor 238, controller/processor 240, memory 242, and/or the like) may transmit, to the UE and based at least in part on the one or more multi-panel capabilities, a scheduling configuration for multi-panel operation of the plurality of panels, as described above.

Process 500 may include additional aspects, such as any single aspect or any combination of aspects described below and/or in connection with one or more other processes described elsewhere herein.

In a first aspect, receiving the indication of the one or more multi-panel capabilities comprises receiving a communication that includes the indication of the one or more multi-panel capabilities. In a second aspect, alone or in combination with the first aspect, the one or more multi-panel capabilities comprise at least one of a quantity of the plurality of panels, a quantity of active panels supported by the UE, a time duration for switching between active panels that are scheduled for consecutive transmissions, respective quantities of spatial layers that are supported for the plurality of panels, respective quantities of beams that are supported for the plurality of panels, or respective activation times for the plurality of panels. In a third aspect, alone or in combination with one or more of the first and second aspects, the one or more multi-panel capabilities comprise at least one of an indication of a group of panels, of the plurality of panels, that share one or more parameters. In a fourth aspect, alone or in combination with one or more of the first through third aspects, the one or more parameters comprise at least one of a same power control parameter, a same timing alignment, or a same activation status.

In a fifth aspect, alone or in combination with one or more of the first through fourth aspects, the one or more multi-panel capabilities comprises a quantity of the plurality of panels, and the scheduling configuration comprises an indication of one or more requested panels, of the plurality of panels, that are to be used for communication with the BS. In a sixth aspect, alone or in combination with one or more of the first through fifth aspects, the one or more multi-panel capabilities comprises a time duration for switching between active panels, of the plurality of panels, that are scheduled for back-to-back transmission, and the scheduling configuration comprises an indication of a quantity of symbols between respective transmissions associated with the active panels. In a seventh aspect, alone or in combination with one or more of the first through sixth aspects, transmitting the scheduling configuration comprises transmitting a communication that includes the scheduling configuration, the communication comprising at least one of an RRC communication, a MAC-CE communication, or a DCI communication.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    identifying one or more multi-panel capabilities for multi-panel operation of a plurality of panels associated with the UE, wherein the one or more multi-panel capabilities comprise;
        a quantity of active panels supported by the UE, and
        an indication of a group of panels, of the plurality of panels, that share a same power control parameter;
    transmitting, to a network entity, an indication of the one or more multi-panel capabilities; and
    receiving, based at least in part on the indication of the one or more multi-panel capabilities, a scheduling configuration for multi-panel operation of the plurality of panels.

2. The method of claim 1, wherein transmitting the indication of the one or more multi-panel capabilities comprises:
    transmitting a communication that includes the indication of the one or more multi-panel capabilities,
        the communication comprising:
            a radio resource control (RRC) communication, or
            an uplink control information (UCI) communication.

3. The method of claim 1, wherein the one or more multi-panel capabilities further comprise at least one of:
    a quantity of the plurality of panels,
    respective identifiers associated with the plurality of panels,
    a time duration for switching between active panels that are scheduled for consecutive transmissions,
    respective quantities of spatial layers that are supported for the plurality of panels,
    respective quantities of beams that are supported for the plurality of panels, or
    respective activation times for the plurality of panels.

4. The method of claim 1, wherein the one or more multi-panel capabilities further comprise:
    an indication that the group of panels share one or more other parameters.

5. The method of claim 4, wherein the one or more other parameters comprise at least one of:
    a same timing alignment, or
    a same activation status.

6. The method of claim 1, wherein the one or more multi-panel capabilities further comprises:
    a quantity of the plurality of panels; and
    wherein the scheduling configuration indicates one or more requested panels, of the plurality of panels, that are to be used for communication with the network entity.

7. The method of claim 1, further comprising:
    activating one or more requested panels based at least in part on one or more panel identifiers indicated by the scheduling configuration.

8. A method of wireless communication performed by a network entity, comprising:
    receiving, from a user equipment (UE), an indication of one or more multi-panel capabilities for multi-panel operation of a plurality of panels associated with the UE, wherein the one or more multi-panel capabilities comprise;
        a quantity of active panels supported by the UE, and
        an indication of a group of panels, of the plurality of panels, that share a same power control parameter;
    determining, based at least in part on the one or more multi-panel capabilities and one or more measurements associated with the plurality of panels, a scheduling configuration for multi-panel operation of the plurality of panels; and
    transmitting, to the UE, the scheduling configuration.

9. The method of claim 8, wherein receiving the indication of the one or more multi-panel capabilities comprises:
    receiving a communication that includes the indication of the one or more multi-panel capabilities,
        the communication comprising:
            a radio resource control (RRC) communication, or
            an uplink control information (UCI) communication.

10. The method of claim 8, wherein the one or more multi-panel capabilities further comprise at least one of:
  a quantity of the plurality of panels,
  a time duration for switching between active panels that are scheduled for consecutive transmissions,
  respective quantities of spatial layers that are supported for the plurality of panels,
  respective quantities of beams that are supported for the plurality of panels, or
  respective activation times for the plurality of panels.

11. The method of claim 8, wherein the one or more multi-panel capabilities further comprise at least one of:
  an indication that the group of panels share one or more other parameters.

12. The method of claim 11, wherein the one or more other parameters comprise at least one of:
  a same timing alignment, or
  a same activation status.

13. The method of claim 8, wherein the one or more multi-panel capabilities further comprises:
  a quantity of the plurality of panels; and
  wherein the scheduling configuration comprises:
    an indication of one or more requested panels, of the plurality of panels, that are to be used for communication with the network entity.

14. The method of claim 8, wherein the one or more measurements include, for each of the plurality of panels, at least one of:
  a signal-to-interference-plus-noise ratio (SINR), or
  a transmit power measurement.

15. The method of claim 8, wherein transmitting the scheduling configuration comprises:
  transmitting a communication that includes the scheduling configuration,
    the communication comprising:
      a radio resource control (RRC) communication,
      a medium access control (MAC) control element (MAC-CE) communication, or
      a downlink control information (DCI) communication.

16. A user equipment (UE) for wireless communication, comprising:
  one or more memories; and
  one or more processors coupled to the one or more memories, the one or more processors configured to:
    identify one or more multi-panel capabilities for multi-panel operation of a plurality of panels associated with the UE, wherein the one or more multi-panel capabilities comprise;
      a quantity of active panels supported by the UE, and
      an indication of a group of panels, of the plurality of panels, that share a same power control parameter;
    transmit, to a network entity, an indication of the one or more multi-panel capabilities; and
    receive, based at least in part on the indication of the one or more multi-panel capabilities, a scheduling configuration for multi-panel operation of the plurality of panels.

17. The UE of claim 16, wherein the one or more processors, when transmitting the indication of the one or more multi-panel capabilities, are configured to:
  transmit a communication that includes the indication of the one or more multi-panel capabilities,
    the communication comprising:
      a radio resource control (RRC) communication, or
      an uplink control information (UCI) communication.

18. The UE of claim 16, wherein the one or more multi-panel capabilities further comprise at least one of:
  a quantity of the plurality of panels,
  respective identifiers associated with the plurality of panels,
  a time duration for switching between active panels that are scheduled for consecutive transmissions,
  respective quantities of spatial layers that are supported for the plurality of panels,
  respective quantities of beams that are supported for the plurality of panels, or
  respective activation times for the plurality of panels.

19. The UE of claim 16, wherein the one or more multi-panel capabilities further comprise:
  an indication that the group of panels share one or more other parameters.

20. The UE of claim 19, wherein the one or more other parameters comprise at least one of:
  a same timing alignment, or
  a same activation status.

21. The UE of claim 16, wherein the one or more multi-panel capabilities further comprises:
  a quantity of the plurality of panels; and
  wherein the scheduling configuration indicates one or more requested panels, of the plurality of panels, that are to be used for communication with the network entity.

22. The UE of claim 16, wherein the one or more processors are further configured to:
  activate one or more requested panels based at least in part on one or more panel identifiers indicated by the scheduling configuration.

23. A network entity for wireless communication, comprising:
  one or more memories; and
  one or more processors coupled to the one or more memories, the one or more processors configured to:
    receive, from a user equipment (UE), an indication of one or more multi-panel capabilities for multi-panel operation of a plurality of panels associated with the UE, wherein the one or more multi-panel capabilities comprise;
      a quantity of active panels supported by the UE, and
      an indication of a group of panels, of the plurality of panels, that share a same power control parameter;
    determine, based at least in part on the one or more multi-panel capabilities and one or more measurements associated with the plurality of panels, a scheduling configuration for multi-panel operation of the plurality of panels; and
    transmit, to the UE, the scheduling configuration.

24. The network entity of claim 23, wherein the one or more processors, when receiving the indication of the one or more multi-panel capabilities, are configured to:
  receive a communication that includes the indication of the one or more multi-panel capabilities,
    the communication comprising:
      a radio resource control (RRC) communication, or
      an uplink control information (UCI) communication.

25. The network entity of claim 23, wherein the one or more multi-panel capabilities comprise at least one of:
  a quantity of the plurality of panels,
  a time duration for switching between active panels that are scheduled for consecutive transmissions,
  respective quantities of spatial layers that are supported for the plurality of panels, respective quantities of beams that are supported for the plurality of panels, or respective activation times for the plurality of panels.

26. The network entity of claim 23, wherein the one or more multi-panel capabilities further comprise at least one of:

an indication that the group of panels share one or more other parameters.

27. The network entity of claim 26, wherein the one or more other parameters comprise at least one of:

a same timing alignment, or a same activation status.

28. The network entity of claim 23, wherein the one or more multi-panel capabilities further comprises:

a quantity of the plurality of panels; and wherein the scheduling configuration comprises:

an indication of one or more requested panels, of the plurality of panels, that are to be used for communication with the network entity.

29. The network entity of claim 23, wherein the one or more measurements include, for each of the plurality of panels, at least one of:

a signal-to-interference-plus-noise ratio (SINR), or a transmit power measurement.

30. The network entity of claim 23, wherein the one or more processors, when transmitting the scheduling configuration, are configured to:

transmit a communication that includes the scheduling configuration, the communication comprising:

a radio resource control (RRC) communication, a medium access control (MAC) control element (MAC-CE) communication, or a downlink control information (DCI) communication.

\* \* \* \* \*